United States Patent
Weindorf et al.

(10) Patent No.: US 10,598,927 B2
(45) Date of Patent: Mar. 24, 2020

(54) DETECTING POLARIZATION OF A VIEWER'S EYEWEAR

(71) Applicant: Visteon Global Technologies, Inc., Van Buren Township, MI (US)

(72) Inventors: Paul Fredrick Luther Weindorf, Novi, MI (US); Brian John Hayden, Royal Oak, MI (US); Kong Pheng Lor, Warren, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 35 days.

(21) Appl. No.: 15/617,590

(22) Filed: Jun. 8, 2017

(65) Prior Publication Data
US 2018/0357505 A1 Dec. 13, 2018

(51) Int. Cl.
*G02B 27/00* (2006.01)
*G06K 9/46* (2006.01)
(Continued)

(52) U.S. Cl.
CPC ....... *G02B 27/0093* (2013.01); *G02B 5/3025* (2013.01); *G02B 5/3058* (2013.01); *G02B 27/0101* (2013.01); *G02B 27/288* (2013.01); *G02F 1/0136* (2013.01); *G02F 1/1396* (2013.01); *G02F 1/133528* (2013.01); *G06K 9/00281* (2013.01); *G06K 9/4661* (2013.01); *G06T 7/73* (2017.01); *G02B 2027/014* (2013.01); *G02B 2027/0118* (2013.01); *G02B 2027/0138* (2013.01); *G02B 2027/0181* (2013.01); *G02C 7/12* (2013.01); *G02F 2001/133548* (2013.01);
(Continued)

(58) Field of Classification Search
None
See application file for complete search history.

(56) References Cited

U.S. PATENT DOCUMENTS

| | | | | |
|---|---|---|---|---|
| 8,970,571 B1* | 3/2015 | Wong | ................. | G02B 27/0101 345/207 |
| 2007/0206201 A1* | 9/2007 | de Groot | ............ | G01B 9/02004 356/512 |

(Continued)

FOREIGN PATENT DOCUMENTS

| JP | S62289065 A | 12/1987 |
|---|---|---|
| JP | 2012-103331 A | 5/2012 |

(Continued)

OTHER PUBLICATIONS

European Search Report Issued in corresponding European Patent Application No. EP 18175187.6 dated Oct. 18, 2018.
(Continued)

*Primary Examiner* — Kim Y Vu
*Assistant Examiner* — Nathan J Bloom
(74) *Attorney, Agent, or Firm* — Dickinson Wright PLLC

(57) ABSTRACT

Disclosed herein are systems, methods, and devices for detecting a polarization of eyewear worn by a viewer gazing at an electronic display. The detection disclosed herein may be employed to control and adjust the electronic display to compensate for the effects of polarization. The systems disclosed herein incorporate an embodiment with two IR sources, and an embodiment employing a single IR source coupled with electro-optical devices.

24 Claims, 7 Drawing Sheets

(51) Int. Cl.
  *G06K 9/00* (2006.01)
  *G02F 1/01* (2006.01)
  *G02B 5/30* (2006.01)
  *G02F 1/139* (2006.01)
  *G02B 27/01* (2006.01)
  *G02B 27/28* (2006.01)
  *G02F 1/1335* (2006.01)
  *G06T 7/73* (2017.01)
  *G02C 7/12* (2006.01)

(52) U.S. Cl.
  CPC ............... *G06T 2207/10048* (2013.01); *G06T 2207/10152* (2013.01); *G06T 2207/30201* (2013.01)

(56) References Cited

U.S. PATENT DOCUMENTS

| | | | | |
|---|---|---|---|---|
| 2009/0225156 A1* | 9/2009 | Akiyama | ........... | A61B 1/00096 348/68 |
| 2009/0324075 A1* | 12/2009 | Shiiyama | ............. | G06K 9/4647 382/170 |
| 2013/0002839 A1* | 1/2013 | Pennisi | ............. | G06K 9/00281 348/58 |
| 2013/0083172 A1* | 4/2013 | Baba | ....................... | G02B 27/26 348/49 |
| 2017/0336864 A1* | 11/2017 | Broz | ........................ | G09G 5/02 |

FOREIGN PATENT DOCUMENTS

| | | |
|---|---|---|
| JP | 2013516882 A | 5/2013 |
| JP | 2016130066 A | 7/2016 |
| JP | 2016148871 A | 8/2016 |
| WO | 2011083433 A1 | 7/2011 |
| WO | 2017/188276 A1 | 11/2017 |

OTHER PUBLICATIONS

Japanese Office Action for related Japanese Patent Application No. 2018110300 dated Apr. 16, 2019, 5 pages, English Translation Included.

* cited by examiner

DETECTING POLARIZATION OF A VIEWER'S EYEWEAR

BACKGROUND

Electronic displays are provided in many contexts to electronically render digital information to a viewer. The electronic displays receive information, and render the information through lighted cells in patterns that reflect the texts and pictures employed to convey the information.

A head-up display (HUD) allows a viewer to view not only the lighted information, but due to the transparent nature of the HUD, the view through the HUD. Thus, a viewer may be delivered information while not losing the ability to view the real world through the HUD.

As shown in FIG. 1, a HUD 100 may include at least a projection unit 110 (or picture generating source), a combiner 120, and a video generation computer 130. Although shown as separate components, all the elements together compose a singular HUD implementation.

The projection unit 110 in a HUD 100 has a convex lens or concave mirror with a light emitting technology (for example, a Cathode Ray Tube (CRT), light emitting diode, or liquid crystal display at its focus). This setup produces an image where the light is collimated, i.e. the focal point is perceived to be in front of the windscreen at a predetermined distance.

The combiner 120 is typically an angled flat or curved piece of glass located directly in front of the viewer, that redirects the projected image from a projection unit 110 in such a way as to see the field of view and the projected image at the same time. Combiners 120 may have special coatings that reflect the light projected onto it from the projector unit 110 while allowing all other wavelengths of light to pass through. In some optical layouts, combiners may also have a curved surface to refocus the image from the projecting unit 110. In some optical layouts, combiners may also have a curved surface to provide additional dioptric power to the projecting unit 110 to magnify the image.

The computer 130 provides the interface between the HUD 100 and the systems/data to be displayed and generates the imagery to be displayed by the projection unit 110.

In certain HUD applications, the illumination may be provided with additional properties to improve the image. One such technique employed in HUD applications is the use of s-polarization (i.e. an s-polarized optical wave). S-polarization adds optical power to the content being displayed because of a higher reflectivity associated with the s-polarization.

In certain HUD applications, only s-polarization (i.e. an s-polarized optical wave) content is displayed. The main reason to employ s-polarization in a HUD implementation is that in some designs there is no coating on the combiner or polarization dependent structure (e.g. grating). Thus, the reflectivity of s-polarization is always greater than the reflectivity of p-polarization.

However, many viewers employ eyewear or other viewing devices that use p-polarization (for example, sunglasses). These devices are employed to avoid deleterious effects caused by environmental conditions, such as sun light.

Thus, by employing an s-polarization component with eyewear that employs p-polarization, the viewer of the HUD is left with a degraded or non-visible image. Several techniques may be employed to address this, such as providing a quarter-wave plate. However, this solution requires additional power to maintain the brightness when a viewer is not wearing a polarized eyewear device.

SUMMARY

The following description relates to systems, methods, and applications for detecting polarization of a viewer's eyewear. Exemplary embodiments may also be directed to any of the system, the method, or an application disclosed herein, and the subsequent adjustment of a display (for example a HUD) based on the same.

Additional features of the invention will be set forth in the description which follows, and in part will be apparent from the description, or may be learned by practice of the invention.

The aspects disclosed herein relate to a system for detecting polarization of a viewer's eyewear being worn on the viewer's face. This system includes at least a first IR source oriented at the viewer's face; a second IR source orientated at the viewer's face; a horizontal polarization plate disposed between the first IR source and the viewer's face; a vertical polarization plate disposed between the second IR source the viewer's face; a camera to detect reflected images from the viewer's face; and a microprocessor to control the first IR source, the second IR source, and the camera, and to determine the viewer's eyewear.

Also disclosed herein is a system for detecting polarization of a viewer's eyewear. The system includes an IR source oriented at the viewer's face; a polarizer provided in the path between the IR source and the viewer's face; an electro-optical device in abutment with the polarizer, and in between the polarizer and the viewer's face; a camera to detect reflected images from the viewer's face; and a microprocessor to control the IR source, the electro-optical device, and the camera, and to determine the viewer's eyewear.

Also disclosed herein is a system for detecting polarization of a viewer's eyewear. The system includes a camera to detect reflected images from the viewer's face; a polarizer provided in the path between the viewer's face and the camera; an electro-optical device in abutment with the polarizer, and in between the polarizer and the viewer's face; a microprocessor to control the IR source, the electro-optical device, and the camera, and to determine the viewer's eyewear.

Also disclosed herein is a system for detecting polarization of a viewer's eyewear. The system includes an IR source oriented at the viewer's face; a camera to detect reflected images from the viewer's face; a first polarizer provided in the path between the viewer's face and the camera; a first electro-optical device in abutment with the first polarizer, and in between the first polarizer and the viewer's face; a second polarizer provided in the path between the IR source and the viewer's face; a second electro-optical device in abutment with the second polarizer, and in between the second polarizer and the viewer's face; a microprocessor to control the IR source, the first and second electro-optical devices, and the camera, and to determine the viewer's eyewear.

Also disclosed herein is a system for detecting polarization of a viewer's eyewear. The system includes a first camera directed at the viewer's face; a second camera directed at the viewer's face; an IR source orientated at the viewer's face; a horizontal polarization plate disposed between the first camera and the viewer's face; a vertical polarization plate disposed between the second camera and the viewer's face; and a microprocessor to control the IR source the first camera, and the second camera, and to determine the viewer's eyewear.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

Figure 1:
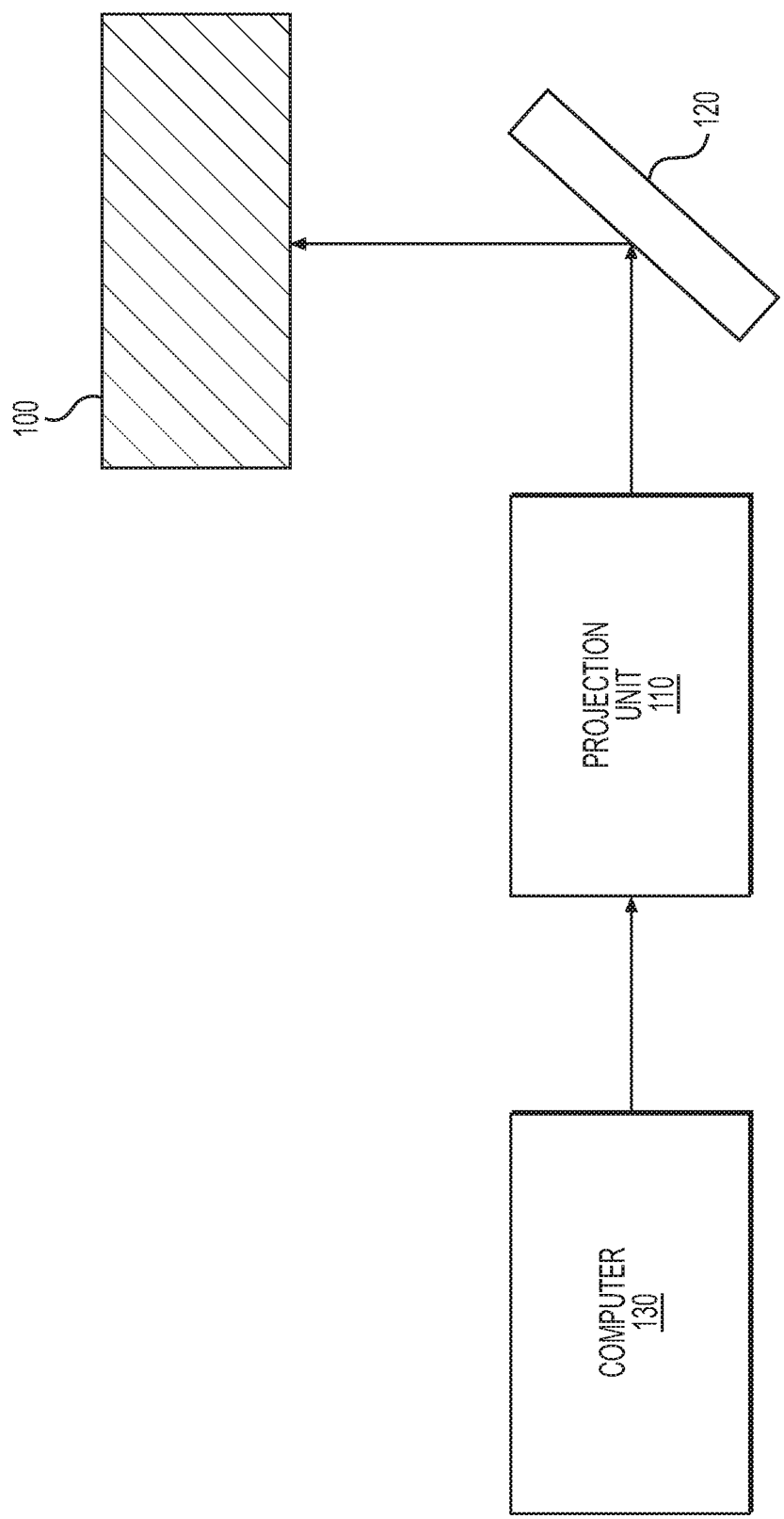
FIG. 1 illustrates a HUD implementation according to the prior art.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

As explained above, the HUD is becoming more commonplace in vehicle-based implementations. The HUD allows a viewer of the HUD to view content on the combiner, while simultaneously viewing the landscape beyond the combiner. Thus, the HUD provides an enhanced implementation of the display experience.

In certain contexts, for example vehicles, the HUD is naturally suited for implementation. Vehicle's often have combiners as part of the windshield (or front window). In other implementations, the combiner may be implemented on any transparent surface provided with a vehicle.

As explained above, if a viewer wears sunglasses (or any eyewear), the content on the HUD may be not viewable. This is due to either natural phenomena causing the content on the HUD to be polarized with a specific polarization, or through a conscious choice by the implementer to employ the specific polarization. Thus, if the eyewear is of a different polarization (for example p-polarization or some polarization between p and s), the content on the HUD becomes degraded or non-visible.

Disclosed herein are methods and systems provided to detect the polarization of eyewear worn by a viewer of a display (such as a HUD). By employing the concepts disclosed herein, the implementer of these systems may detect whether the viewer is wearing glasses of a specific polarization. In another embodiment, the methods and systems disclosed herein may advantageously be provided with additional control capabilities to adjust a HUD based on the detection.

The aspects disclosed herein employ a combination of at least one infrared (IR) sourced light, a variably-provided polarization plate, and a camera. Employing the aspects disclosed herein, it may be achievable to detect whether the viewer is wearing polarized eyewear, and the type of polarized lens being worn.

Figure 2A:
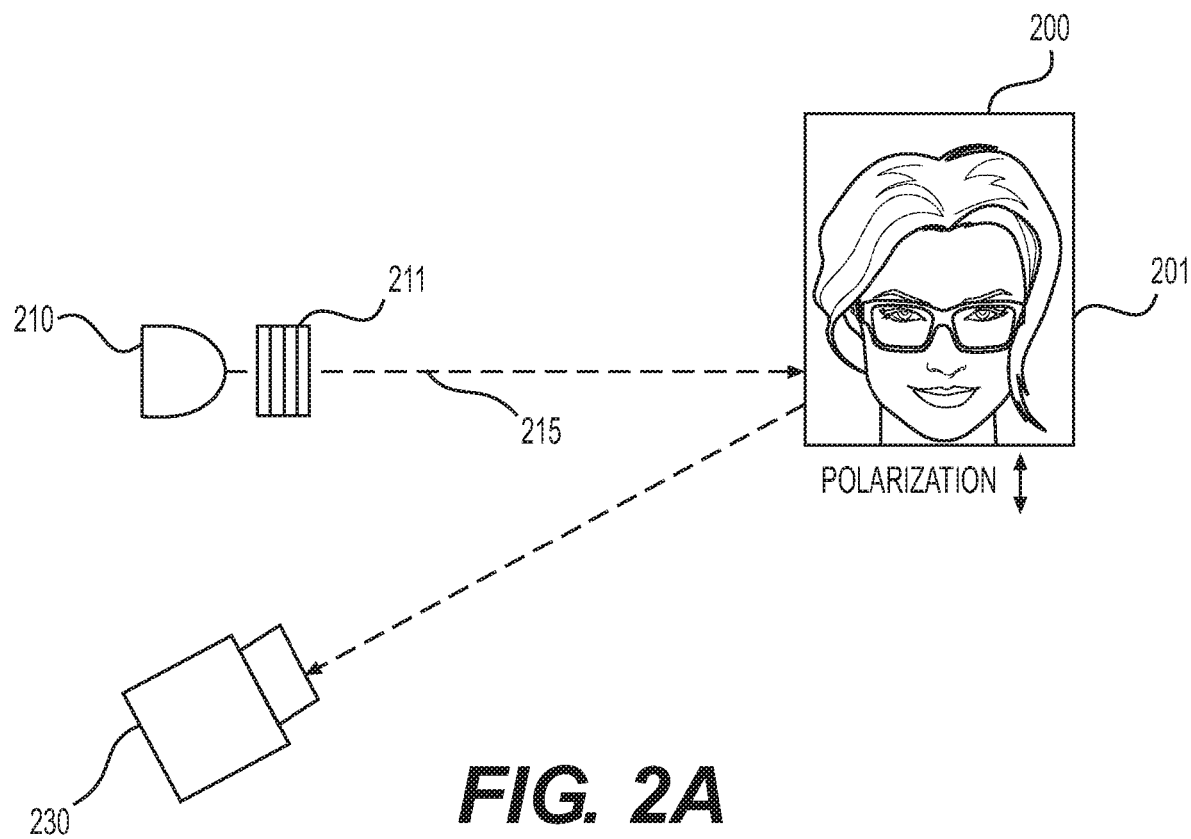
FIGS. 2(a) and 2(b) illustrate an example implementation of a system for detecting polarization of eyewear according to a first embodiment.

FIGS. 2(a) and (b) illustrate an example of a system to determine if a viewer is wearing polarized eyewear according to a first embodiment. As shown in FIGS. 2(a) and (b), an IR light source 210, and an IR light source 220 are shown. Also shown, are vertical polarization plate 211 and horizontal polarization plate 221.

Figure 3:
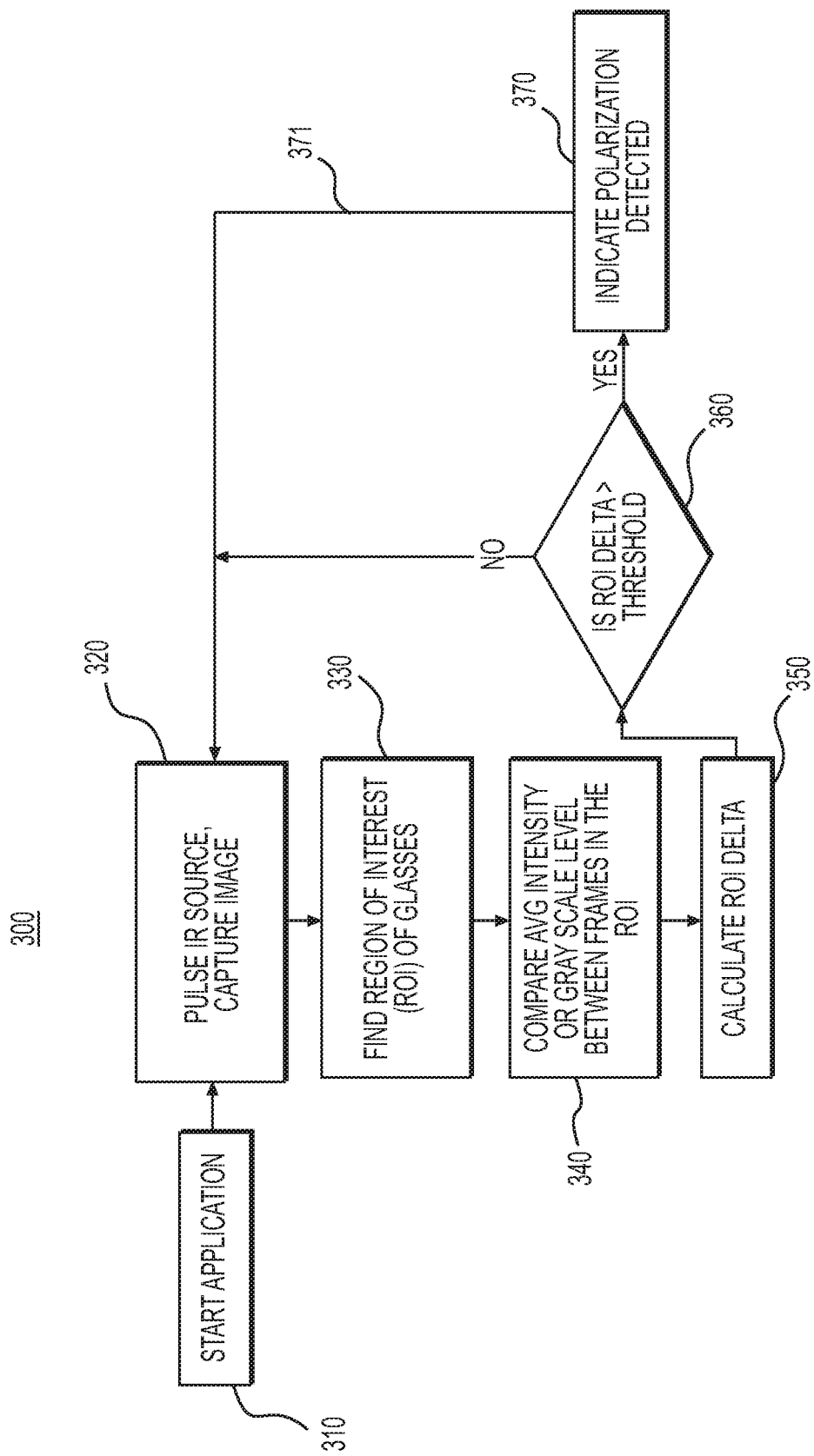
FIG. 3 illustrates a method for performing the detection of FIGS. 2(a) and (b)

A camera 230 is also provided, both the camera 230 and the light sources 210/220 are oriented towards eyes of the viewer 200. The various elements shown in FIGS. 2(a) and (b) may be controlled via instructions provided in a microprocessor (not shown). The instructions may be configured according method 300. FIG. 3 illustrates a flowchart of method 300 employable via a microprocessor provided to control the elements in FIGS. 2(a) and (b).

In operation 310, an application is started to detect the polarization eyewear worn by the viewer 200. After which, the IR sources (210 and 220) are each individually pulsed (320) along pathway 215 and 225 respectively, with the camera 230 capturing an image of the viewer's 200 face during each pulse.

As shown in both FIGS. 2(a) and (b), the pathway 215 propagates through a vertical polarizer, while the pathway 225 propagates through a horizontal polarizer. Thus, each polarizer selectively allows IR light from sources 210 and 220 based on the provided polarization.

Thus, after operation 320, an image associated with a IR source 210 flashing IR light may be obtained, as well as a second image associated with IR source 220. Flashing IR light may be obtained. These two images are stored. In operation 330, a region-of-interest (ROI) is obtained through image recognition techniques. The ROI is defined as the area of the viewer 200's face containing eyewear.

In operation 340, the average intensity of both images is derived through image processing technology. The average intensity (or gray scale intensity) may be derived for each image, with a delta between the images being calculated (350).

In operation 360, a determination is made as to whether the ROI delta is over a predetermined threshold. The predetermined threshold may be set as a difference between detecting a surface of a lens of eyewear and an average of skin-types visible through the polarized lenses. This predetermined threshold may be set based on finding a tolerance employable with a whole host of commercially available eyewear offerings. If the ROI delta is over the threshold, in operation 370, an indication is made that the viewer 200 is wearing polarized eyewear. If not, the method 300 proceeds back to operation 320 (to be performed iteratively).

After the indication is made, the method 300 (via pathway 371) may also return to operation 320, and be performed iteratively.

Figure 2B:
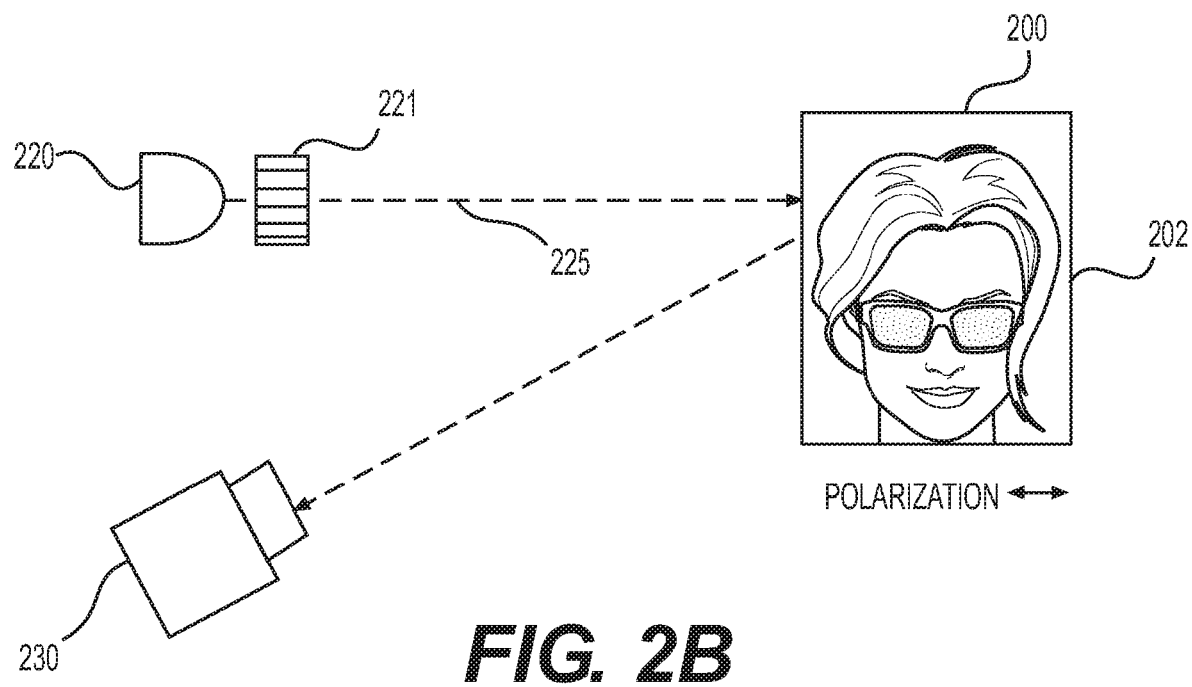

FIGS. 2(a) and (b) also illustrates the phenomena that allows the method 300 in FIG. 3 to be effective. As shown, in FIG. 2(a), the viewer 200's eyes 201 are visible, and thus are able to be captured by camera 230. Conversely, in FIG. 2(b), the opposite is true based on image 202. This is due to the fact that the eyewear is vertically polarized. Thus, the light propagated through pathway 215 is able to illuminate the images behind the eyewear. For the same reasons, the light propagated via pathway 225 is incapable of showing anything behind the eyewear in FIG. 2(b). This allows the image contrast (or gray scale contrast) between image 201 and 202 to differ, thereby allowing detection of polarized lenses.

As such, the amount of contrast differs between 201 and 202, leading to the detection in operation 370 that the viewer 200 is wearing polarized eyewear.

The inventors have performed tests and have found employing a light wavelength within 825-875 nm (and most preferably 850 nm) allows for an optimal detection. Tests performed have indicated that the wavelength range disclosed above leads to optimal detection.

Figure 4:
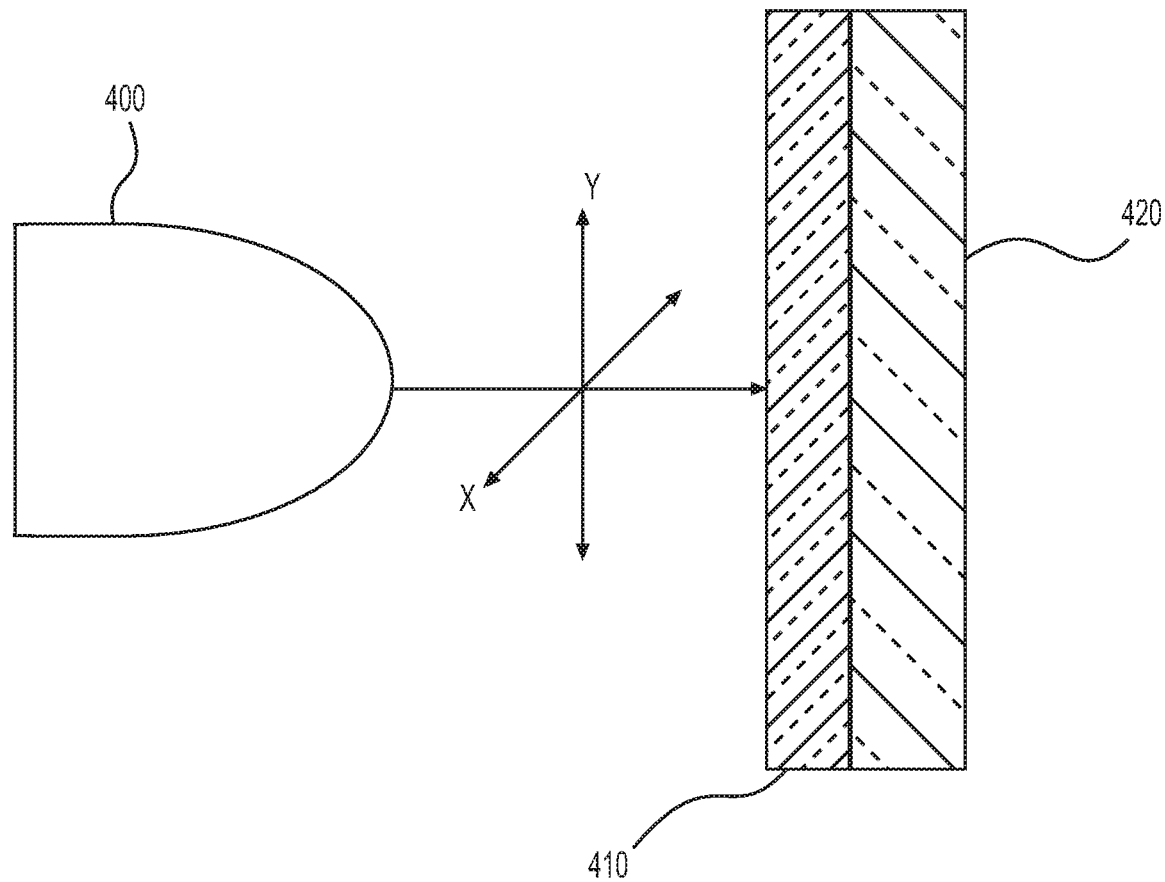
FIG. 4 illustrates an example implementation of a system for detecting polarization of eyewear according to a second embodiment.
Figure 5B:
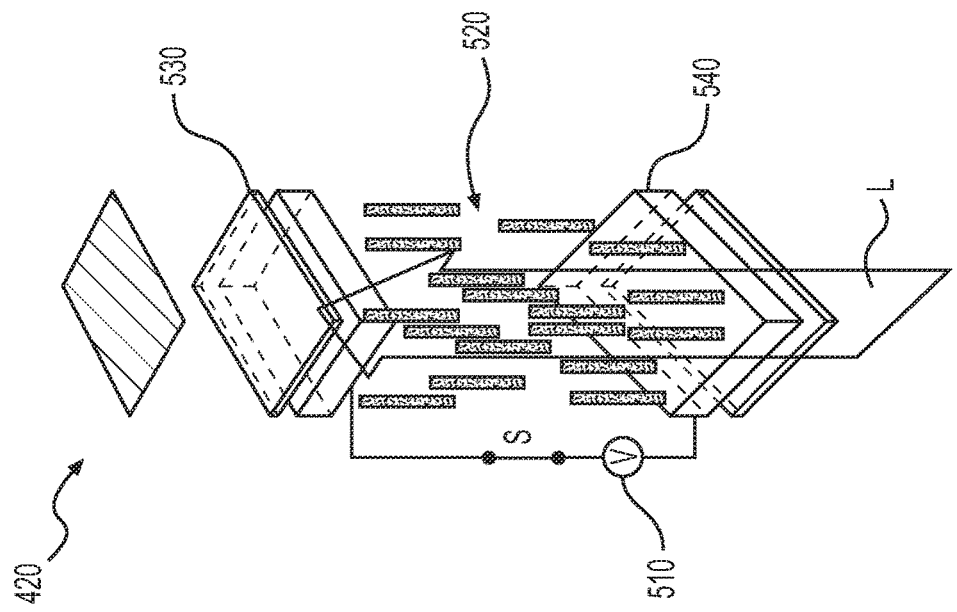
FIGS. 5(a) and 5(b) illustrate an operation of the electro-optical device of FIG. 4.

FIG. 4 illustrates a second embodiment of the aspects disclosed herein. As shown in FIG. 4, a single IR source 400 is provided. Additionally, a wire-grid polarizer 410 is also provided. In abutment with the wire-grid polarizer 410 is a liquid crystal cell (or electro-optical device) 420. The electro-optical device 420 will be explained in greater detail with the explanation in FIG. 5.

The system in FIG. 4 illustrates how only one IR source may be employed to detect polarized eyewear, rather than the two shown in FIG. 2.

Wire-grid polarizer 410 is used, because the inventors have discovered that other polarizers (such as dye and iodine polarizers) lose their polarization properties in the IR region (850-950 nm). However, the wire-grid polarizer 410 provides superior operation with IR wavelengths required to operate with the various systems disclosed herein.

Figure 5A:
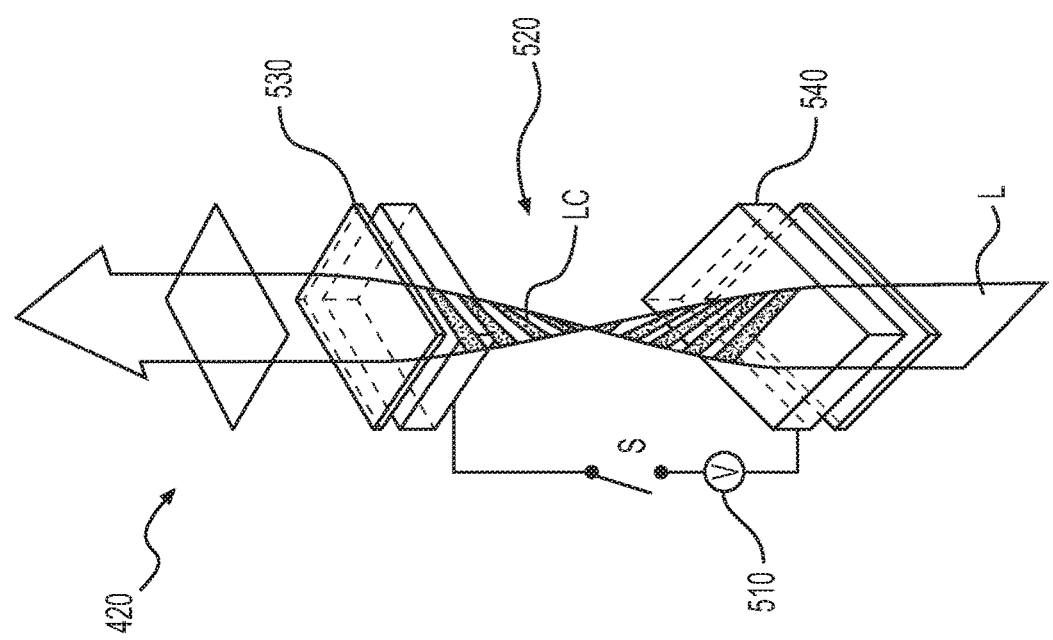

As shown in FIGS. 5(a) and (b), the electro-optical device 420 (which may be a TN cell for example) controls the rotation of the polarized light from the wire-grid polarizer 410 when the voltage 510 is applied to the electro-optical device 420. Therefore if the wire-grid transmission axis is horizontal (x direction), then with no voltage 510 (FIG. 5(a)) on the electro-optical device 420, the polarized light is rotated to the vertical orientation. When voltage 510 (FIG. 5(b)) is applied to the electro-optical device 420, the polarized light from the wire-grid polarizer 410 is not rotated and IR polarization remains horizontal. The wire-grid polarizer 410 may be oriented for a vertical transmission axis and in this case vertically polarized light transmits through the electro-optical device 420 when voltage 510 is applied and is rotated horizontally when voltage 510 is not applied.

As shown, the power source (voltage) 510 is connected to a first node 530 of the electro-optical device 420 and a second node 540. Thus, when the switch shown in FIGS. 5(a) and (b) is closed, and voltage is applied across nodes 530 and 540, the orientation of liquid crystals 520 also changes from horizontal to vertical.

Thus, employing the aspects disclosed herein. The electro-optical device 420 may change states in operation 320, thereby allowing a camera 230 to capture the viewer 200's eyewear area in condition where IR is transmitted horizontally and vertically.

Figure 6:
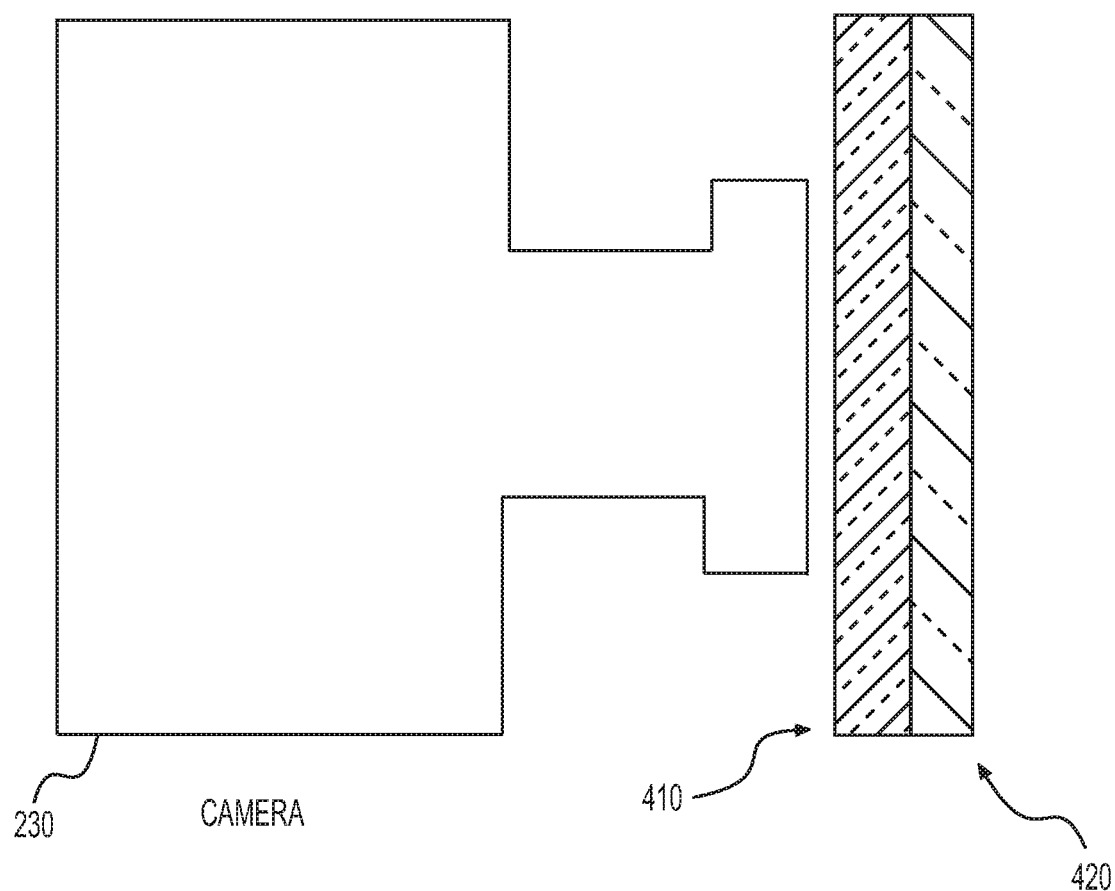
FIG. 6 illustrates an example implementation of a system for detecting polarization of eyewear according to a third embodiment.

FIG. 6 illustrates a third embodiment of the aspects disclosed herein. In FIG. 6, the camera 230 is provided with the wire-grid polarizer 410 and the electro-optical device 420. In the embodiment shown in FIG. 6, the polarization of the electro-optical device 420 is switched similarly to the embodiment shown in FIG. 4.

One of the advantages of using the polarization analyzer in front of the camera is that the ambient IR in the sunlight actually helps rather than fights the IR source. In fact, an extension of the system would extend the camera IR filter to include part of or the entire visible spectrum.

A fourth embodiment is also disclosed. In a fourth embodiment, the element 410 and 420 are placed at both the camera portion 230 of the system and by the IR source 400. By employing the elements at both location, the detection of the difference employed in the determination of operation 370 improves.

Figure 7:
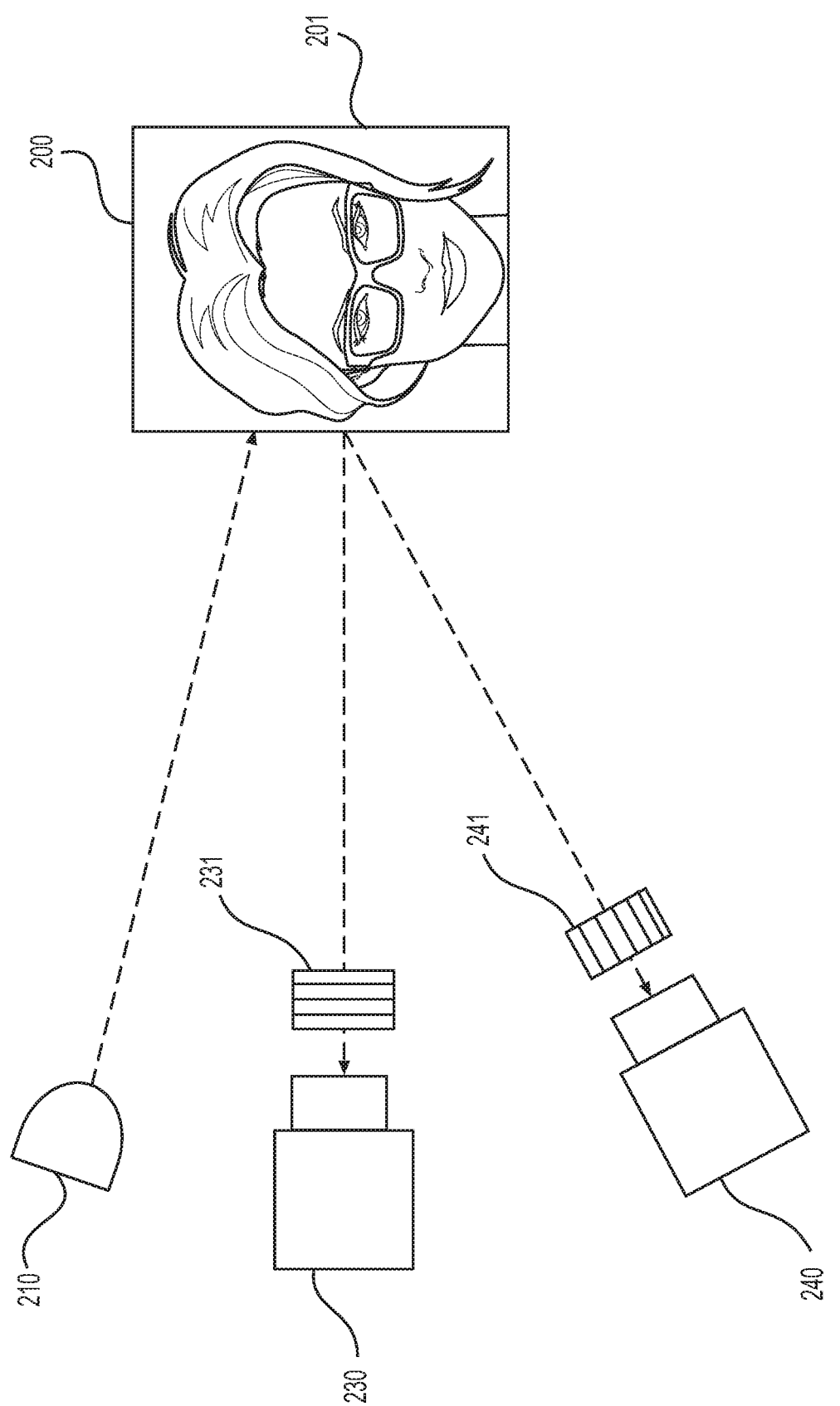
FIG. 7 illustrates another embodiment of a system employing the aspects disclosed herein.

FIG. 7 illustrates a fifth embodiment of a system employing the aspects disclosed herein. As shown in FIG. 7, there is a single IR source 210. The IR source 210 is configured to pulse an IR light towards a viewer's face. In response, the reflection is captured by the camera 230 and a second camera 240. In between each camera is a vertical polarizer 231 and a horizontal polarizer 241, respectively.

Employing the concepts disclosed herein, the microprocessor may employ the image detection as discussed above to determine the polarization of the eyewear being worn by the viewer 200.

Certain of the devices shown include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing systems networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Various combinations of cameras, IR sources, polarization plates, and electro-optical devices are illustrated above. Others not described, but employable using the concepts disclosed herein, may be available based on this disclosure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for detecting polarization of a viewer's eyewear being worn on the viewer's face, comprising:
    a first IR source oriented at the viewer's face;
    a second IR source orientated at the viewer's face;
    a horizontal polarization plate disposed between the first IR source and the viewer's face;
    a vertical polarization plate disposed between the second IR source the viewer's face;
    a camera to detect reflected images from the viewer's face;
    a microprocessor to control the first IR source, the second IR source, and the camera, and to determine the viewer's eyewear; and
    a first electro-optical device in abutment with a second horizontal polarizer in front of the camera, and in between the second horizontal polarizer and the viewer's face; and
    a second electro-optical device in abutment with a second vertical polarizer in front of the camera, and in between the second vertical polarizer and the viewer's face,
    wherein the microcontroller is further configured to control the first electro-optical device and the second electro-optical device.

2. The system according to claim 1, wherein the microprocessor is configured to perform the following:
    generating a first IR light from the first IR source, and capturing a first image of the viewer's face;
    generating a second IR light from the second IR source, and capturing a second image of the viewer's face, and
    performing an analysis on the first image and the second image to perform the determination.

3. The system according to claim 2, wherein the analysis comprises the following steps:
    performing image analysis on the first image and the second image to determine an eyewear location of the viewer's face;
    detecting a grayscale amount between the first image and the second image;
    calculating a delta from the detected grayscale amount; and
    in response to the delta being over a predetermined threshold, indicating that the viewer is wearing polarized eyewear.

4. The system according to claim 3, wherein the indication is communicated to a head-up display (HUD) to adjust the HUD to compensate for the detected polarization.

5. The system according to claim 1, wherein the first IR source and the second IR source generate light at a wavelength between 700 nm to 1050 nm.

6. A system for detecting polarization of a viewer's eyewear, comprising:
an IR source oriented at the viewer's face;
a camera to detect reflected images from the viewer's face;
a polarizer provided in the path between the viewer's face and the camera, wherein the polarizer is a wire-grid polarizer;
an electro-optical device in abutment with the polarizer, and in between the polarizer and the viewer's face;
a microprocessor to control the IR source, the electro-optical device, and the camera, and to determine the viewer's eyewear.

7. The system according to claim 6, wherein the microprocessor is configured to perform the following:
generating a first IR light from the IR source, controlling the electro-optical device to be in a first orientation, and capturing a first image of the viewer's face;
generating a second IR light from the IR source, controlling the electro-optical device to be in a second orientation, and capturing a second image of the viewer's face, and
performing an analysis on the first image and the second image to perform the determination,
wherein the first orientation and the second orientation are defined as states of liquid crystals being either horizontal or vertical.

8. The system according to claim 7, wherein the analysis comprises the following steps:
performing image analysis on the first image and the second image to determine an eyewear location of the viewer's face;
detecting a grayscale amount between the first image and the second image;
calculating a delta from the detected grayscale amount; and
in response to the delta being over a predetermined threshold, indicating that the viewer is wearing polarized eyewear.

9. The system according to claim 8, wherein the indication is communicated to a head-up display (HUD) to adjust the HUD to compensate for the detected polarization.

10. A system for detecting polarization of a viewer's eyewear, comprising:
an IR source oriented at the viewer's face;
a camera to detect reflected images from the viewer's face;
a first polarizer provided in the path between the viewer's face and the camera;
a first electro-optical device in abutment with the first polarizer, and in between the first polarizer and the viewer's face;
a second polarizer provided in the path between the IR source and the viewer's face;
a second electro-optical device in abutment with the second polarizer, and in between the second polarizer and the viewer's face;
a microprocessor to control the IR source, the first and second electro-optical devices, and the camera, and to determine the viewer's eyewear.

11. The system according to claim 10, wherein the microprocessor is configured to perform the following:
generating a first IR light from the IR source, controlling the first and the second electro-optical device to be in a first orientation, and capturing a first image of the viewer's face;
generating a second IR light from the IR source, controlling the first and the second electro-optical device to be in a second orientation, and capturing a second image of the viewer's face, and
performing an analysis on the first image and the second image to perform the determination,
wherein the first orientation and the second orientation are defined as states of liquid crystals being either horizontal or vertical.

12. The system according to claim 11, wherein the analysis comprises the following steps:
performing image analysis on the first image and the second image to determine an eyewear location of the viewer's face;
detecting a grayscale amount between the first image and the second image;
calculating a delta from the detected grayscale amount; and
in response to the delta being over a predetermined threshold, indicating that the viewer is wearing polarized eyewear.

13. The system according to claim 12, wherein the indication is communicated to a head-up display (HUD) to adjust the HUD to compensate for the detected polarization.

14. The system according to claim 10, wherein the IR source generates light at a wavelength between 700 nm to 1050 nm.

15. The system according to claim 5, wherein the polarizer is a wire-grid polarizer.

16. The system according to claim 1, further comprising
a first camera directed at the viewer's face;
a second camera directed at the viewer's face;
a horizontal polarization plate disposed between the first camera and the viewer's face; and
a vertical polarization plate disposed between the second camera and the viewer's face;
wherein the microcontroller is further configured to control the first camera and the second camera.

17. The system according to claim 1, further comprising
a first electro-optical device in abutment with a second polarizer in front of the camera, and in between the second polarizer and the viewer's face,
wherein the microcontroller is further configured to control the first electro-optical device.

18. The system according to claim 17, wherein the second polarizer is defined as a horizontal polarizer.

19. The system according to claim 17, wherein the second polarizer is defined as a vertical polarizer.

20. A system for detecting polarization of a viewer's eyewear being worn on the viewer's face, comprising:
a first IR source oriented at the viewer's face;
a second IR source orientated at the viewer's face;
a horizontal polarization plate disposed between the first IR source and the viewer's face;
a vertical polarization plate disposed between the second IR source the viewer's face;
at least one electro-optical device in abutment with the vehicle polarization plate, and in between the vertical polarization plate and the viewer's face;
a camera to detect reflected images from the viewer's face; and
a microprocessor configured to control the first IR source, the second IR source, the at least one electro-optical device, and the camera, and to determine a specific polarization of the viewer's eyewear.

21. The system according to claim 20, wherein the microprocessor is configured to perform the following:

capturing a first image of the viewer's face via the camera, and a second image of the viewer's face via a second camera; and performing an analysis on the first image and the second image to perform the determination.

22. The system according to claim 21, wherein the analysis comprises the following steps:

performing image analysis on the first image and the second image to determine an eyewear location of the viewer's face;

detecting a grayscale amount between the first image and the second image;

calculating a delta from the detected grayscale amount; and in response to the delta being over a predetermined threshold, indicating that the viewer is wearing polarized eyewear of the specific polarization.

23. The system according to claim 22, wherein the indication is communicated to a head-up display (HUD) to adjust the HUD to compensate for the detected polarization.

24. The system according to claim 20, wherein the first IR source and the second IR source generate light at a wavelength between 700 nm to 1050 nm.

* * * * *